US007785049B2

(12) United States Patent
Radermacher

(10) Patent No.: US 7,785,049 B2
(45) Date of Patent: Aug. 31, 2010

(54) FASTENING DEVICE FOR A HAND ROUTER ON A MILLING TABLE

(75) Inventor: Uwe Radermacher, Weibem (DE)

(73) Assignee: Wolfcraft GmbH, Kempenich (DE)

( * ) Notice: Subject to any disclaimer, the term of this patent is extended or adjusted under 35 U.S.C. 154(b) by 850 days.

(21) Appl. No.: 11/706,738

(22) Filed: Feb. 15, 2007

(65) Prior Publication Data

US 2007/0221291 A1 Sep. 27, 2007

(30) Foreign Application Priority Data

Feb. 18, 2006 (DE) ...................... 10 2006 007 578
Mar. 16, 2006 (DE) ...................... 10 2006 012 079

(51) Int. Cl.
*B23C 1/20* (2006.01)

(52) U.S. Cl. ...................... 409/229; 409/178; 409/182; 144/136.95; 144/154.5; 144/286.1; 144/286.5; 144/135.2; 403/329; 403/348; 403/349; 403/350

(58) Field of Classification Search ......... 409/178–179, 409/229, 181–182, 175, 235; 144/136.95, 144/154.5, 286.1, 286.5, 135.2, 134.1; 403/326, 403/329, 348, 349, 350
See application file for complete search history.

(56) References Cited

U.S. PATENT DOCUMENTS 2,779,361 A 1/1957 McKiff
4,273,483 A * 6/1981 Mendicino .................. 409/178
4,733,704 A * 3/1988 Wolff ...................... 144/286.1
5,117,879 A 6/1992 Payne
5,289,861 A 3/1994 Hedrick
5,398,740 A * 3/1995 Miller ...................... 144/286.1
5,715,880 A * 2/1998 Tucker et al. ............ 144/286.1
5,803,684 A * 9/1998 Wang ......................... 409/229
5,983,968 A * 11/1999 Newman .................... 144/372
6,305,447 B1 * 10/2001 Rousseau ................. 144/135.2
6,382,276 B1 * 5/2002 Daniels et al. ........... 144/135.2
6,752,572 B2 * 6/2004 Talesky et al. .............. 409/179
7,066,695 B1 * 6/2006 Nuss .......................... 409/182
7,114,538 B2 * 10/2006 Rosendahl ............. 144/136.95
7,159,629 B1 * 1/2007 Rowe ...................... 144/286.1
7,409,973 B2 * 8/2008 Hyde ...................... 144/286.5
2004/0182476 A1 9/2004 Karkosch et al.
2005/0077668 A1 * 4/2005 Clouse ........................ 269/97
2007/0084526 A1 * 4/2007 Radermacher ........... 144/286.1
2007/0221291 A1 9/2007 Radermacher

FOREIGN PATENT DOCUMENTS

| | | |
|---|---|---|
| DE | 2410120 | 9/1975 |
| DE | 10032966 | 1/2002 |
| DE | 10041956 A1 * | 3/2002 |
| DE | 102006012079 | 8/2007 |
| EP | 0545142 | 6/1993 |
| WO | 2004071698 | 8/2004 |

* cited by examiner

*Primary Examiner*—Erica E Cadugan
(74) *Attorney, Agent, or Firm*—K&L Gates LLP

(57) ABSTRACT

A fastening device (61) for fastening a hand router to the underside of a work platform (2) of a workbench (1) has radially outwardly extending projections which are associated with a base ring for the hand router and which may be introduced into associated fastening pockets by rotating the base ring in the work platform (2). The fastening pockets can be formed by fastening members (12) associated with the underside (2') of the work platform (2).

26 Claims, 19 Drawing Sheets

FASTENING DEVICE FOR A HAND ROUTER ON A MILLING TABLE

CROSS REFERENCE TO RELATED APPLICATION

This application claims priority of German Patent Application Numbers 102006007578.1, filed Feb. 18, 2006 and 102006012079.5, filed Mar. 16, 2006 which are incorporated by reference.

BACKGROUND OF THE INVENTION

The invention relates to a fastening device for fastening a hand router to the underside of a work platform of a workbench, having radially outwardly extending projections which are associated with a base ring for the hand router and which may be introduced into associated fastening pockets by rotating the base ring in the work platform. The invention further relates to a workbench having such a fastening device.

A fastening device is known from U.S. Pat. No. 5,289,861. In the cited document a fastening ring is mounted to the hand router which may be contacted with the work platform in the manner of a bayonet lock. The hand router is joined to the work platform in a form-fit manner by use of the fastening ring.

SUMMARY OF THE INVENTION

An object of the present invention can be to provide an improved fastening device or a workbench equipped therewith in a manner advantageous for use.

The object can be achieved, but is not required to be achieved, by embodiments of the present invention which are covered by any single claim taken alone, or by any combination of said claim with any other claim.

In an embodiment of the present invention, fastening pockets are formed by fastening members associated with the underside of the work platform.

The fastening device for a hand router, for example, is preferably designed in such a way that the hand router or the like can be mounted to the work platform as quickly and easily as possible. This is accomplished by a fastening ring which provides fastening projections. The fastening ring is connected to the bottom of the base ring so that the former is securely connected to the latter. A depression is located on the underside of the work platform, at the edge of which fastening members are provided. The depression has an opening through which the rotary drive-operable cutter for the hand router can pass. The depression forms edge recesses whose width in the circumferential direction is more than twice the width of a fastening projection. The fastening members are situated in the edge recesses. The fastening members are formed by insert pieces which at their covered region cover the edge of the depression, and are fixed to the work platform by means of fastening screws that are screwed through fastening openings. Fastening pockets are formed by the fastening members. The side wall of each fastening pocket forms a ridge which is L-shaped in the horizontal projection and which contacts the border of the edge recess, at least in places. At least one leaf spring extends into the fastening pocket to hold the fastening projection in the fastening pocket. Since the insert pieces have a complicated shape, they are produced as injection-molded parts. The insert pieces are made of plastic and therefore have a low weight. At least three fastening projections are located on the fastening ring. The fastening projections each define the same angle with respect to one another, and thus are uniformly distributed around the circumference. The fastening projections make flush contact with the surface of the fastening ring. The thickness of the fastening ring thus corresponds to that of the fastening projections. The depression in the work platform is deeper than the thickness of the fastening ring, and has a circular circumferential contour. The circular circumferential contour centrally accommodates the fastening ring. The fastening ring is fixed in the radial direction by means of fixing elements for the fastening members which act in the radial direction and which are activated when the fastening ring is rotated inward. The fixing elements may be formed by springs and/or beveled flanks. The fixing element is a spring tongue of a leaf spring member which with its second spring tongue impinges on a broad side of the fastening projection. The insert piece has a cover above the side wall. The fastening ring is fixed by a hand-actuated locking member having a locking bar. The locking bar engages with a locking bar engagement opening in the fastening ring. The locking member is actuated from the top side of the work platform by means of a rotary handle. In the locked position the end face of the rotary handle terminates in flush alignment with, or is situated beneath the topside plane of, the work platform. In the unlocked position the end face of the rotary handle is situated above the topside plane of the work platform. The rotary handle projects from the work platform. This ensures that operation cannot begin until the locking member has been actuated, since otherwise the rotary handle prevents a workpiece from being led over the work platform. The locking bar is a sliding bolt, controlled in a mortise-tenon fashion by the rotary handle, which enters a locking bar engagement opening in the fastening ring. In order for the rotary handle to also undergo an axial displacement when actuated, it rests on a bearing surface which resembles a screw thread. As a result, in one position the rotary handle is located above the topside plane of the work platform, and in the other position is beneath same. The fastening ring has beveled surfaces on the flanks for the fastening projections, pointing in the direction of rotation. The beveled surfaces facilitate traversal of the fixing elements.

The fastening members may also be designed as flat elements which at one section each cover a portion of an edge recess. In the installed state of the fastening ring, the sections of the fastening members project beyond the fastening projections for the fastening ring. The fastening ring is held by the fastening members until it is rotationally fixed. The fastening members provide assistance only for installation, and connect the fastening ring to the work platform by means of screws. The screws achieve the intended rotational fixing of the fastening ring and of the hand router mounted thereon. A support stand which bears the work platform may also be adjustable in height. By use of such a support stand the height of the work platform may be adjusted to the particular user and the specific circumstances, and an optimal work height may be set. Such milling tables having a work platform and a fastening device, such as that described above are used for fastening a hand router to the underside of the work platform.

Objects and advantages of the present invention may be desired, but are not necessarily required to practice the present invention. Additional features and advantages of the present invention are described in, and will be apparent from the following Detailed Description of the Invention and the figures.

BRIEF DESCRIPTION OF THE FIGURES

Several exemplary embodiments of the invention are explained below with reference to the accompanying drawings, which show the following.

DETAILED DESCRIPTION OF THE INVENTION

Figure 1:
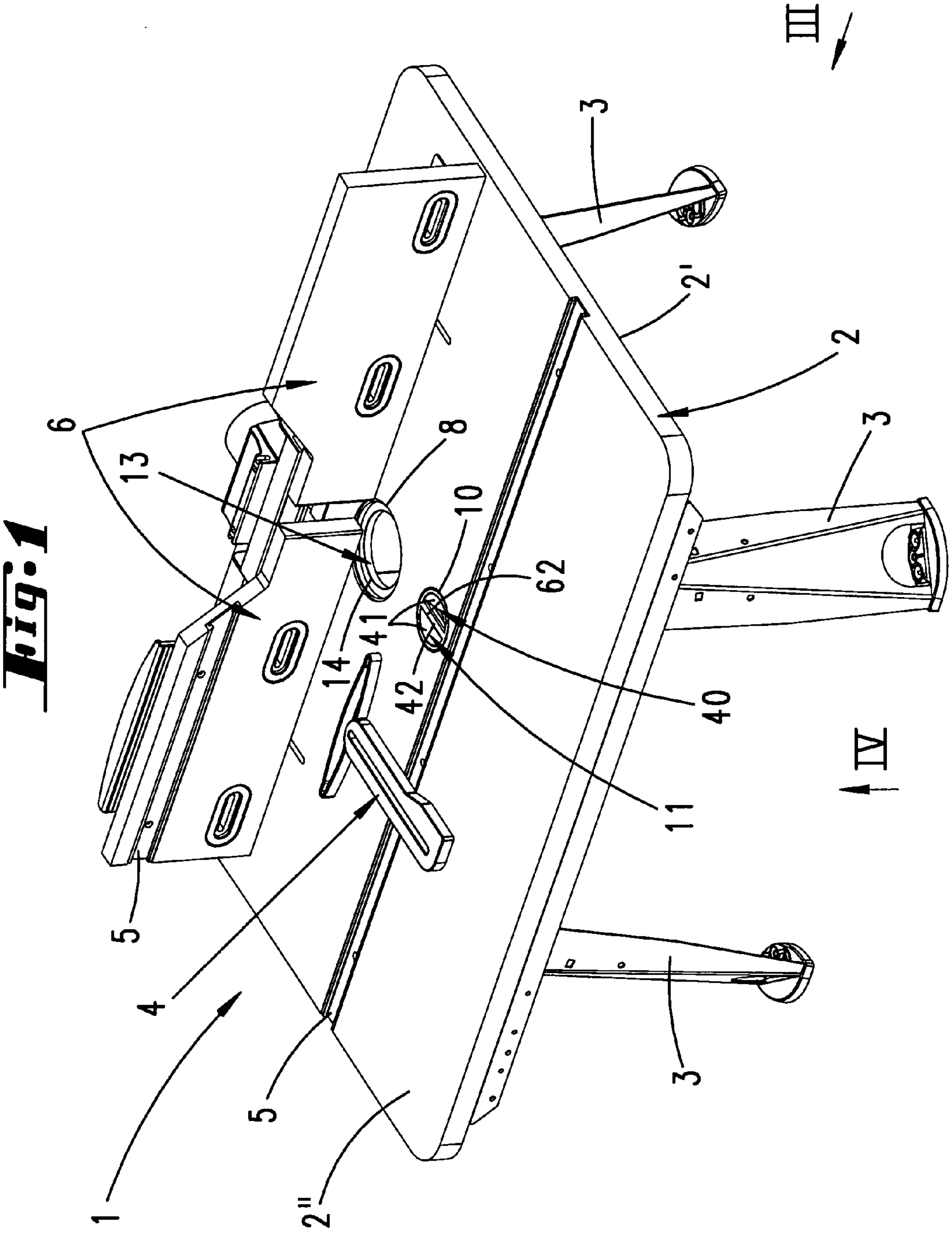
FIG. 1 shows a perspective view of a first exemplary embodiment, in a line of sight directed toward the workbench.

In the first exemplary embodiment (FIGS. 1-23) the workbench 1 essentially comprises a work platform 2. Support legs 3 are provided at the underside 2' of the work platform 2. In the exemplary embodiment, a hold-down element 4 which is guided in a groove 5, and workpiece guide stops 6 are provided on the top side 2" of the work platform 2.

A groove 5 is likewise provided in a workpiece guide stop 6. This groove 5 may also be used for guiding a hold-down element 4. A depression 7 is provided in the underside 2' of the work platform 2. The depression 7 has a central opening 8 which passes through the work platform 2. The depression 7 forms three edge recesses 9. The edge recesses 9 are uniformly distributed around the circumference. The edge recesses 9 are embedded more deeply than is the depression 7.

Figure 2:
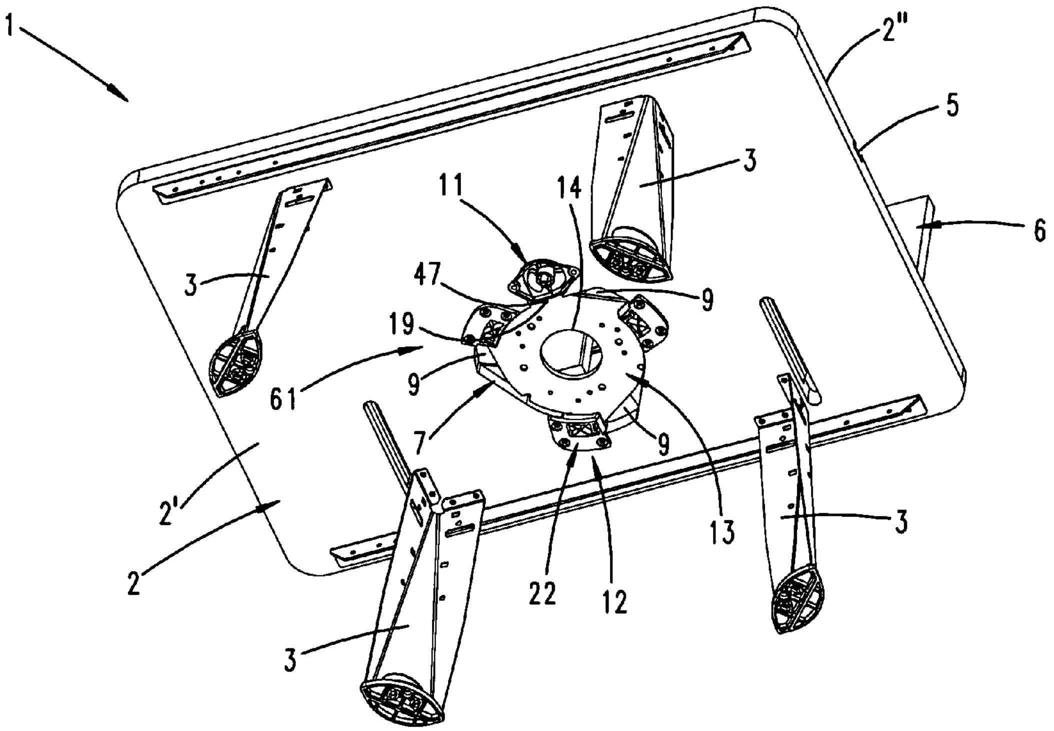
FIG. 2 shows a perspective view in a line of sight beneath the workbench.

An opening 10 which is used for accommodating a locking member 11 is located approximately in the center of the work platform 2. A fastening member 12 is situated in each of the edge recesses 9. As shown in FIG. 2, a fastening ring 13 is situated in the depression 7. The depression 7 in the work platform 2 is deeper than the thickness of the fastening ring 13. The edge recesses 9 in the depression 7 have a circumferential width that is more than twice the width of a fastening projection 18.

The fastening ring 13 has the approximate shape of a disk. A circular opening 14 is centrally located on the fastening ring 13. Boreholes 15 of various sizes are positioned around the opening 14. The boreholes 15 are denoted by recessed letters 16. These boreholes 15 match a given hole pattern for a hand router 17.

Figure 3:
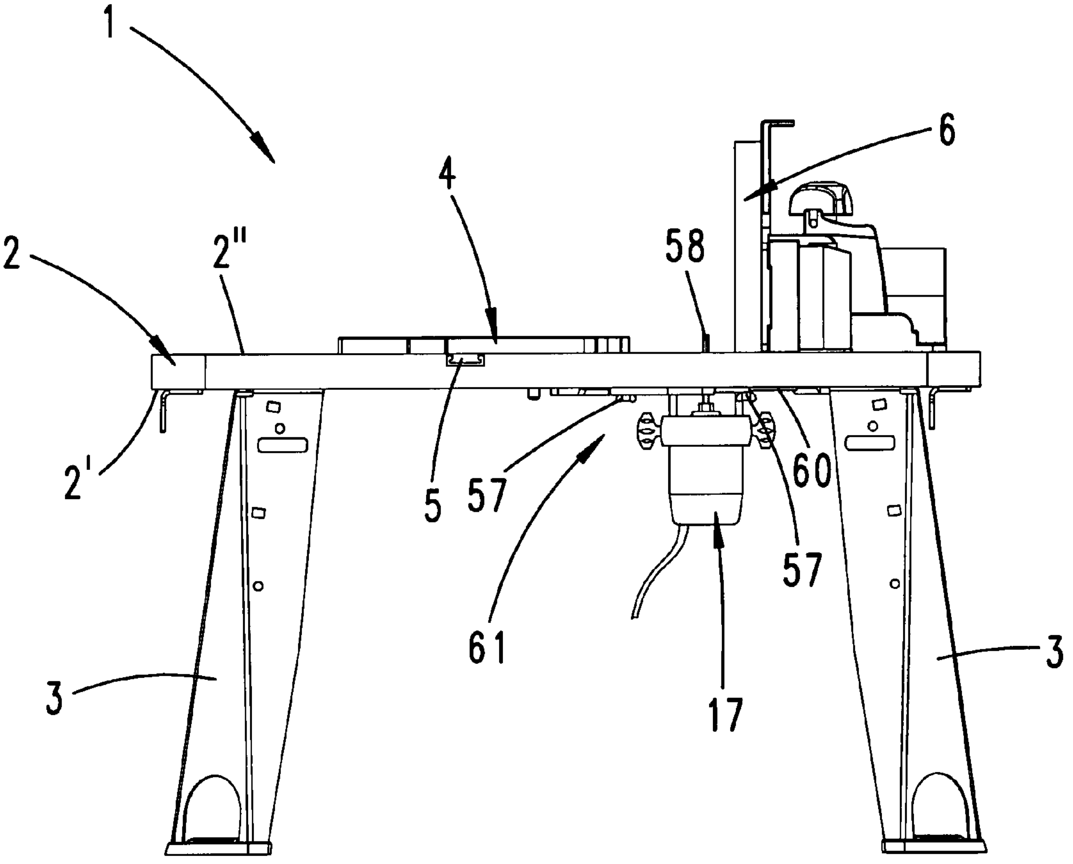
FIG. 3 shows a side view according to line of sight III from FIG. 1, with a fastened hand router.

FIG. 3 shows the workbench 1 in the side view, in which the hand router 17 is mounted on the fastening ring 13 (not illustrated here).

Figure 22:
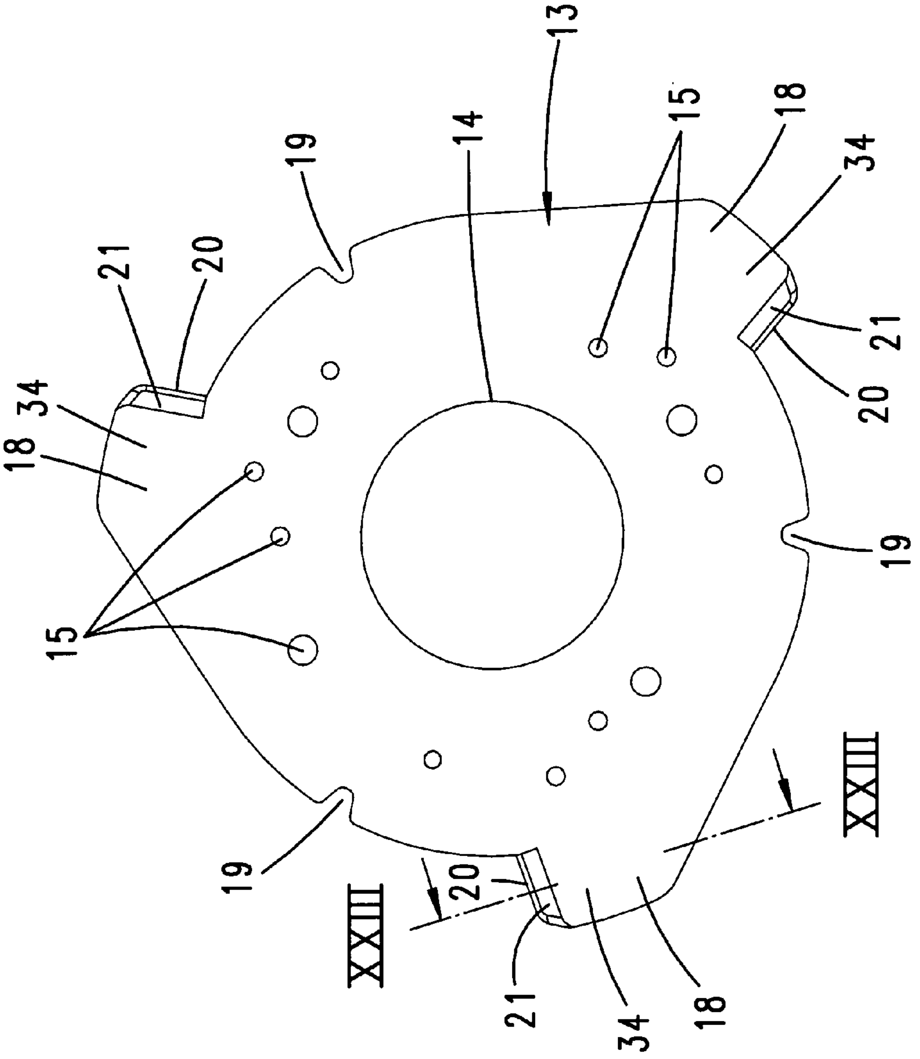
FIG. 22 shows a lower view of the fastening ring.

The boreholes 15 are configured in a design for countersunk screws. At its circumference the fastening ring 13 forms three fastening projections 18. The fastening projections 18 are uniformly distributed around the circumference, so that for three fastening projections 18 an angle of 120° is defined from one fastening projection 18 to the next. A locking bar engagement opening 19 is located between each pair of fastening projections 18. The locking bar engagement opening 19 has a V-shaped design in the direction of the midpoint of the fastening ring 13. FIG. 22 shows that the flanks 20 for the fastening projections 18, pointing in the direction of rotation, have beveled surfaces 21.

Figure 8:
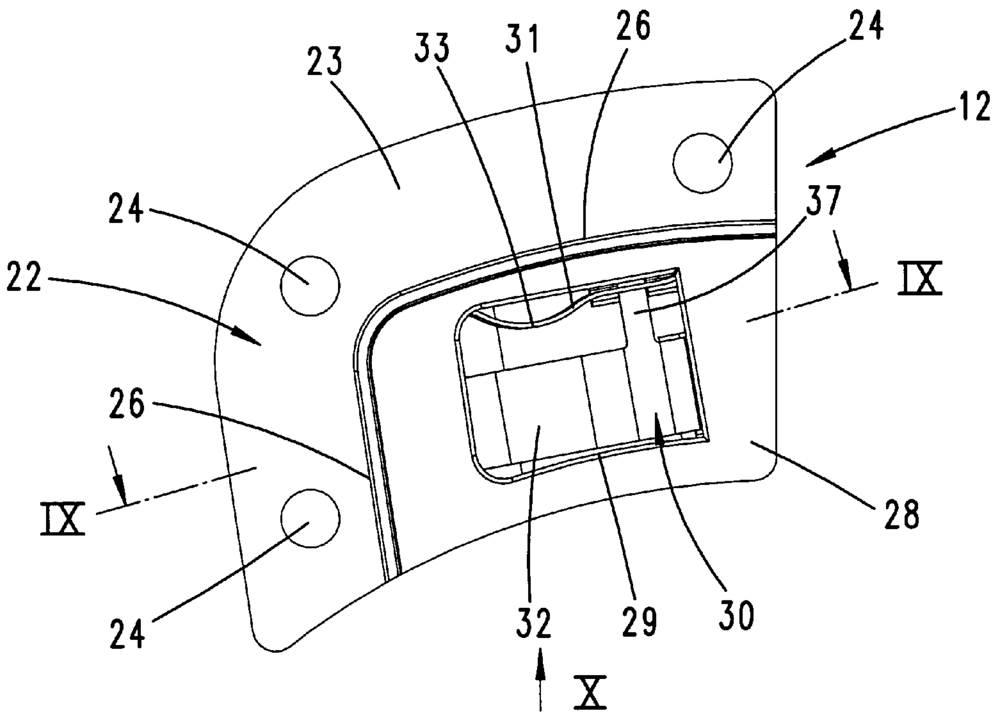
FIG. 8 shows a top view according to line of sight VIII from FIG. 7.
Figure 9:
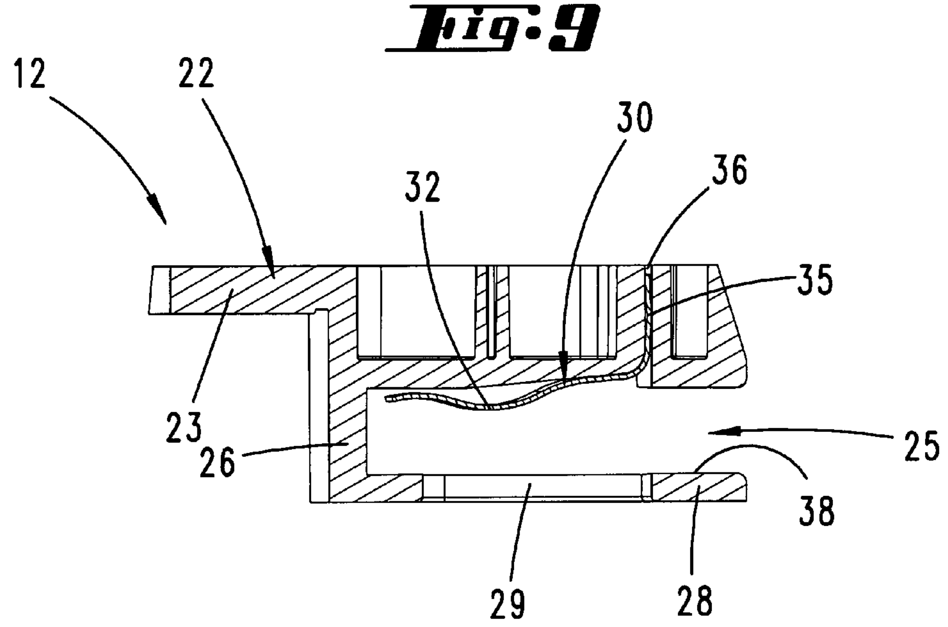
FIG. 9 shows a section according to line IX-IX from FIG. 8.
Figure 10:
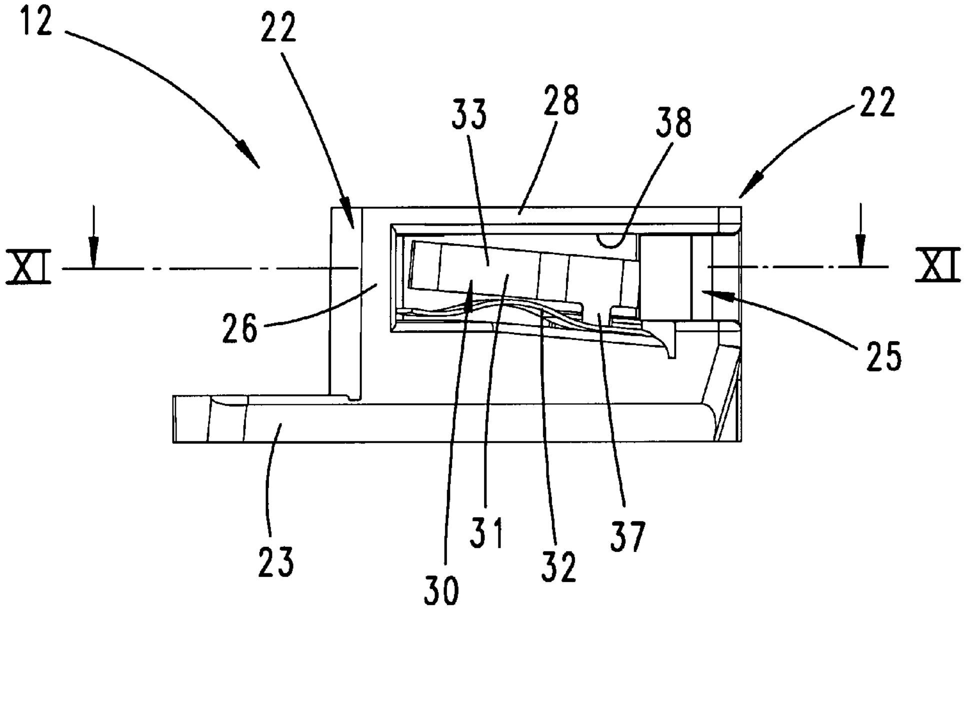
FIG. 10 shows a front view according to line of sight X from FIG. 8.
Figure 11:
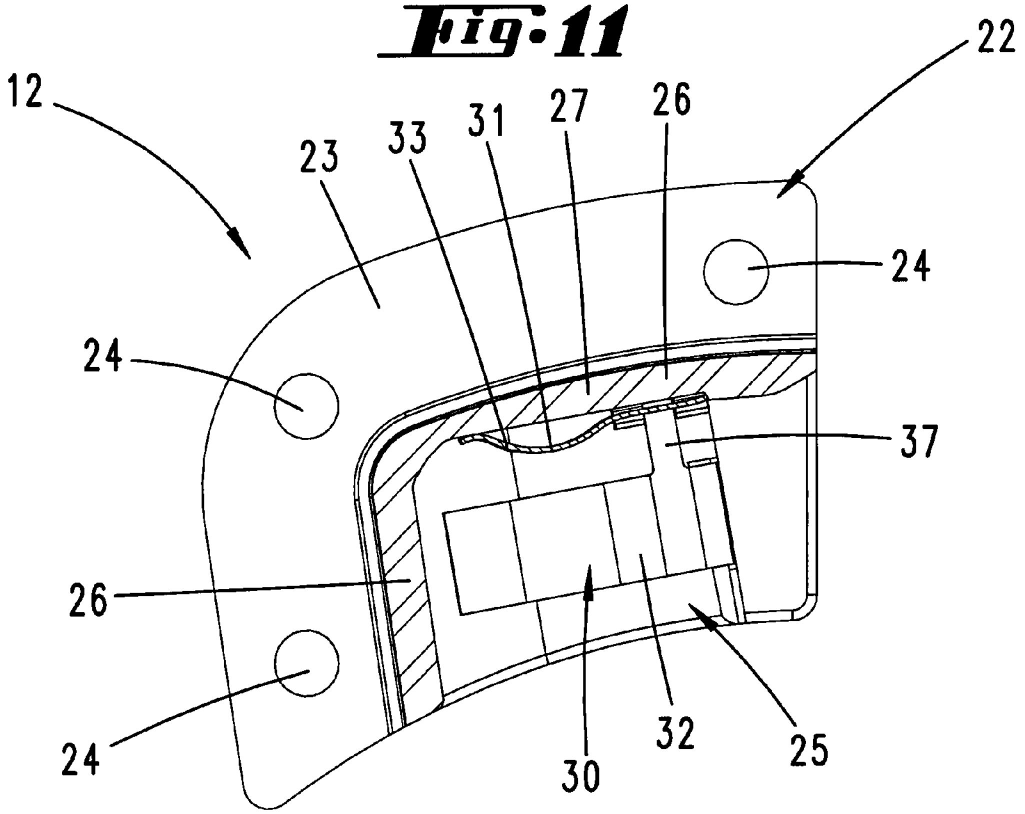
FIG. 11 shows a section according to line XI-XI from FIG. 10.
Figure 12:
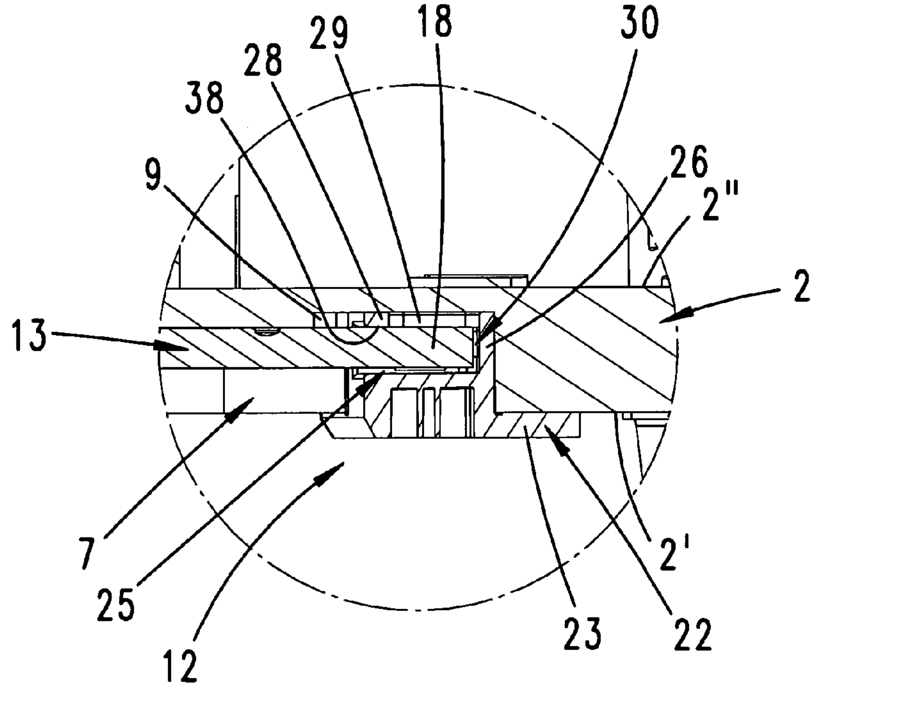
FIG. 12 shows an enlarged cutaway view according to XII from FIG. 5, in which a fastening projection is located in the fastening pocket for the fastening member.

As previously mentioned, the fastening members 12 are situated in the edge recesses 9 in the depressions 7. The fastening members 12 are formed by insert pieces 22. On one side the insert pieces 22 have a covered region 23 in the form of an angled collar. FIG. 8 shows that the covered region 23 has a horizontal contour in the shape of a capital letter L. Fastening openings 24 are located in the covered region 23.

The insert piece 22 forms a fastening pocket 25. The side walls 26 of the fastening pocket 25 form a ridge 27 which is L-shaped in the horizontal projection.

The insert piece 22 forms a cover 28 which adjoins the side walls 26. A passage 29 is located in the cover 28.

A leaf spring member 30 is situated in the fastening pocket 25. The leaf spring member forms a first spring tongue 31 and a second spring tongue 32. The first spring tongue 31 forms a fixing element 33. The fastening ring 13 is fixed in the radial direction by means of fixing elements 33 for the fastening members 12 which act in the radial direction and which are activated when the fastening ring 13 is rotated inward. A broad side 34 situated on the underside of the fastening projection 18 is impinged on by the second spring tongue 32. The leaf spring member 30 is designed as a stamped-bent part.

The first spring tongue 31 and the second spring tongue 32 have an undulating design. The end 35 of the leaf spring member 30 extends into a slot 36 in the insert piece 22. The slot 36 does not have a base. The slot 36 conforms to the shape of the end 35 in order to fix the end 35 in position. To secure the end 35 in the slot 36, the end 35 likewise has an undulating shape. This is readily observed in FIG. 9. The two spring tongues 31, 32 are connected to another by means of a bridge 37 to form a leaf spring member 30.

The edge recess 9 in the depression 7 is deeper than the central region by the magnitude of the thickness of the cover 28 for the insert piece 22. In the installed state, this ensures that the depression 7 and a support surface 38 are located at the same level. This is readily observed in FIG. 12. The insert pieces 22 are fastened to the underside 2' of the work platform 2 by means of fastening screws 39. The fastening screws 39 are inserted through the fastening openings 24 and are screwed to the work platform 2.

Figure 14:
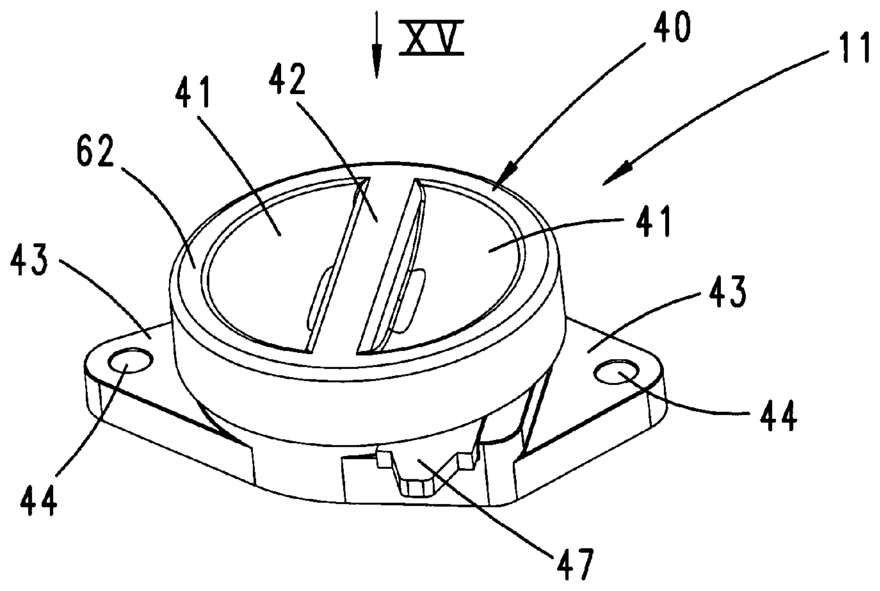
FIG. 14 shows a perspective view of the locking member in the actuated state.
Figure 15:
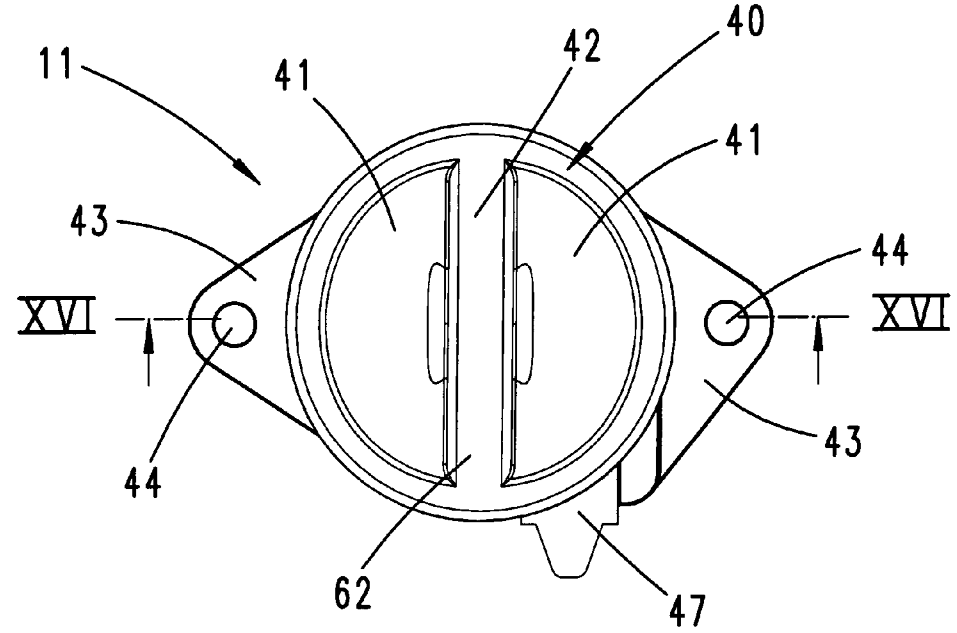
FIG. 15 shows a top view according to line of sight XV from FIG. 14.

The locking member 11 essentially has a cylindrical shape. FIG. 14 shows that the locking member 11 forms an upwardly pointing rotary handle 40. The rotary handle 40 has two recessed grips 41 separated by a bridge 42. The bridge 42 terminates flush with the end face 62 of the rotary handle 40. Beneath the rotary handle 40, the locking member 11 forms fastening flanges 43 extending at both sides. A borehole 44 is located in each fastening flange 43. As shown in the sectional view of FIG. 16, the rotary handle 40 forms a mandrel 45 starting at the bridge 42. The mandrel 45 projects into a borehole 46 in the lower part of the locking member 11. A locking bar 47 is located beneath the rotary handle 40.

Figure 16:
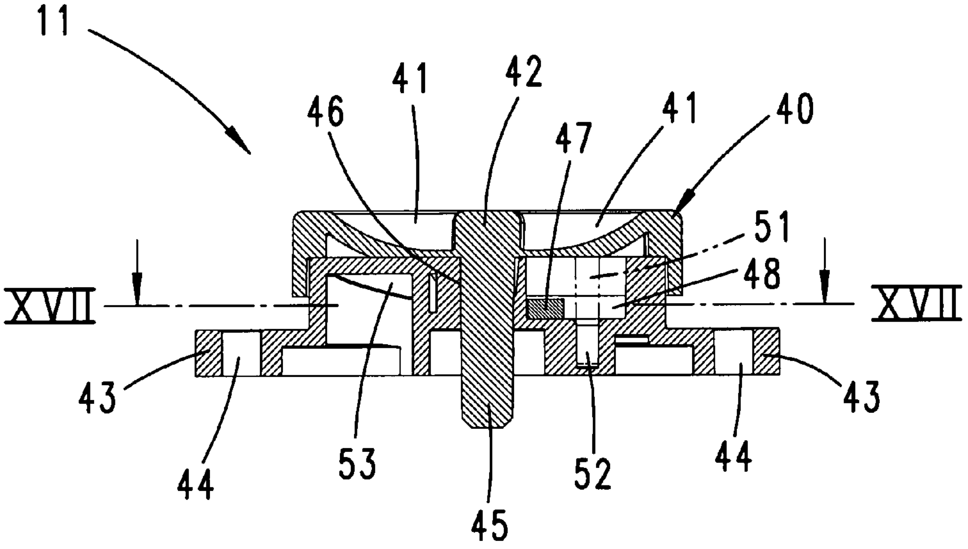
FIG. 16 shows a section according to line XVI-XVI from FIG. 15.
Figure 17:
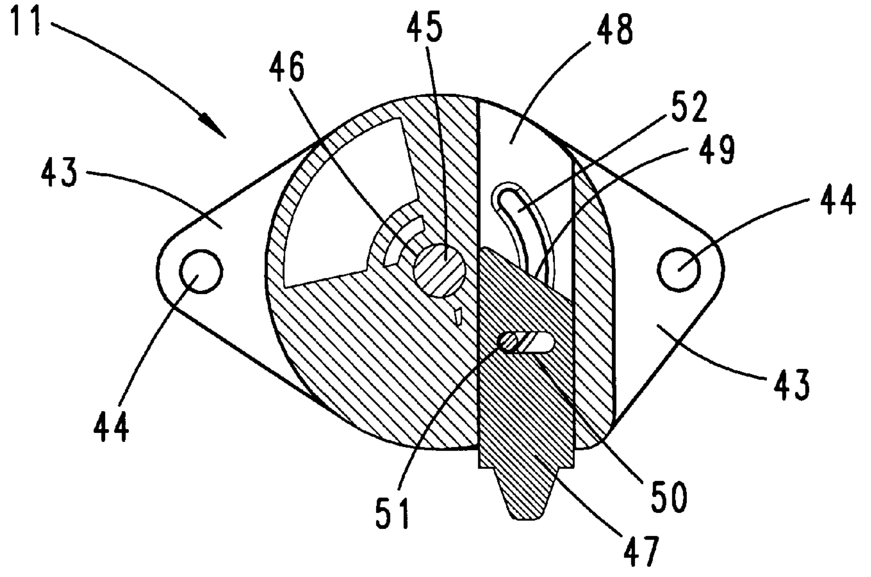
FIG. 17 shows a section according to line XVII-XVII from FIG. 16.
Figure 18:
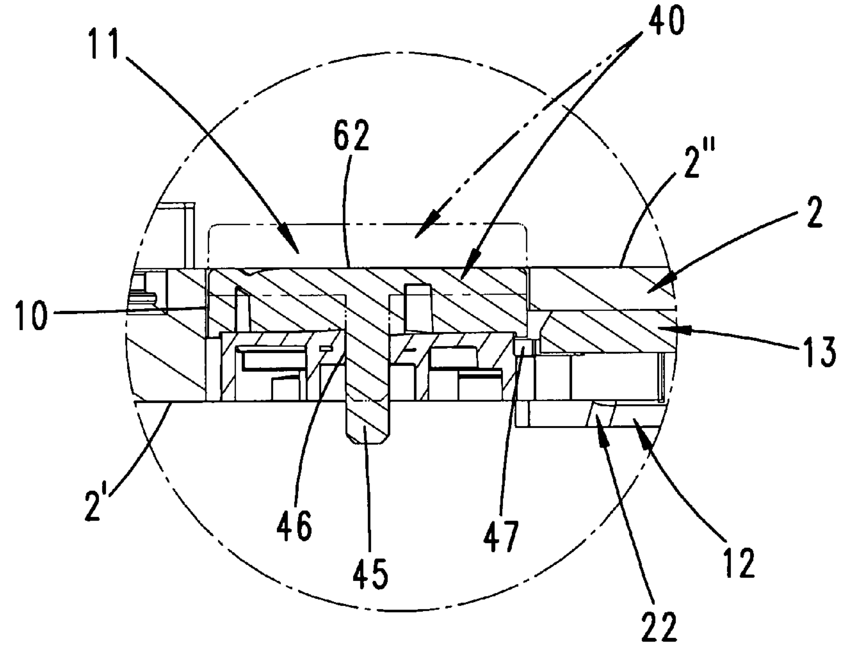
FIG. 18 shows an enlarged cutaway view according to XVIII from FIG. 5.
Figure 19:
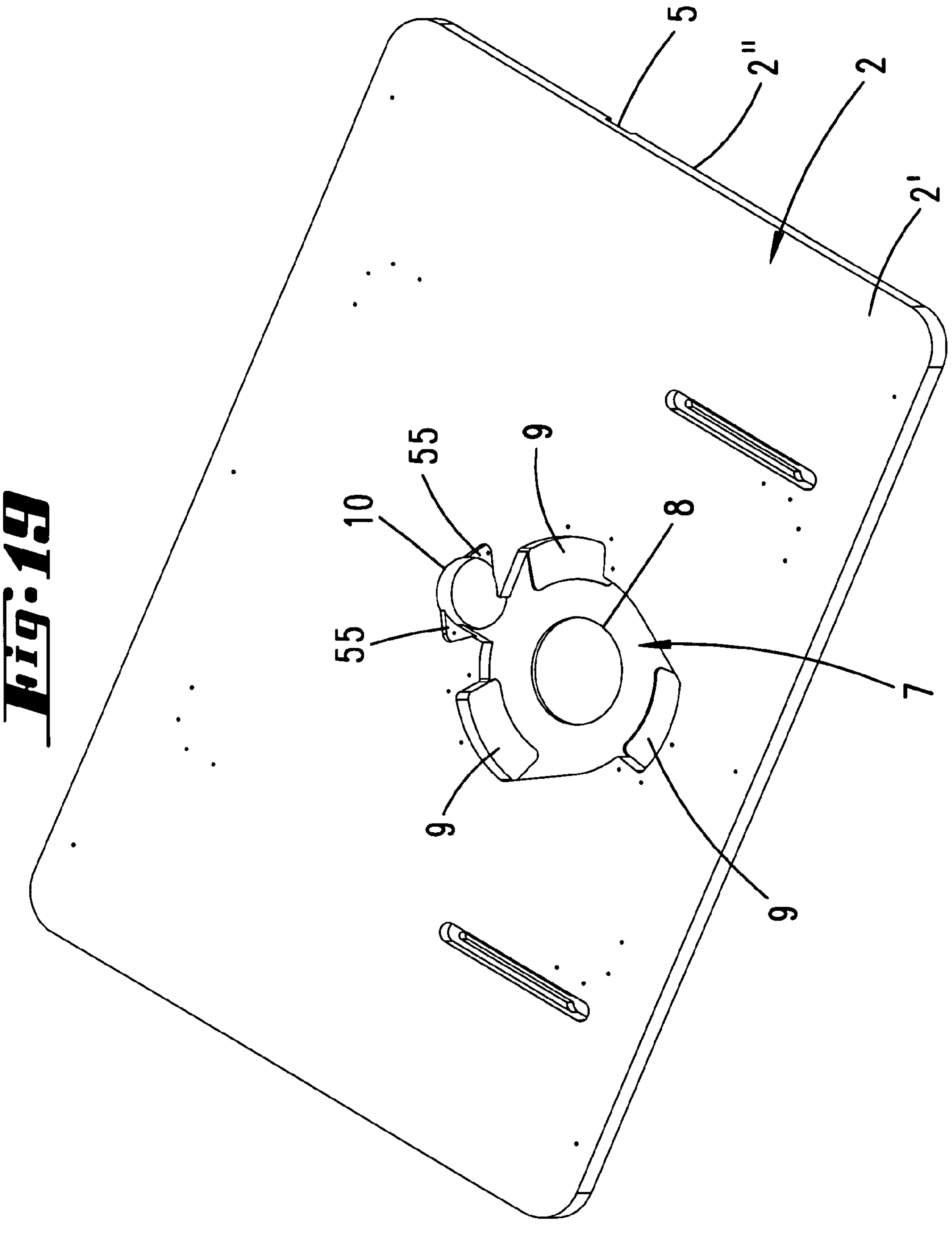
FIG. 19 shows a perspective lower view of the work platform.

FIG. 17 shows that the locking bar 47 is laterally guided in a guide groove 48 next to the mandrel 45. The side of the locking bar 47 protruding from the locking member 11 conforms to the shape of the locking bar engagement openings 19. The locking bar 47 has a beveled surface 49 on its rear end. When the locking bar 47 is in the unlocked position, the beveled surface 49 approximately occupies the part of the missing lateral surface of the cylindrical section. The locking bar 47 contains an oblong hole 50 running transverse to the direction of extension of the locking bar. Starting at the rotary handle 40, a pin 51 projects through the oblong hole 50. As shown in FIG. 17, the lower part of the locking member 11 forms a curved slot 52. The pin 51 projects into this slot 52 (FIG. 16). The two ends of the slot 52 form rotational end stops for the pin 51. Since the rotary handle 40 rests on a support surface 53 which resembles a screw thread, as shown in FIG. 16, the rotary handle 40 when actuated describes a thread-like motion. The mandrel 45 and the pin 51 are designed in such a way that the mandrel 45 and pin 51 cannot be disengaged in either rotational end position. One rotational end position of the rotary handle 40 corresponds to the unlocked position. The other rotational end position of the rotary handle 40 corresponds to the locked position. In the unlocked position the mandrel 45 projects slightly from the lower locking member. As a result of the longer design of the mandrel 45 and the pin 51, assurance is always provided that the mandrel 45 lies in the borehole 46, and the pin 51 lies in the oblong hole 50 in the locking bar 47. FIG. 18 illustrates the locked position of the locking member 11. The manner in which the locking bar 47 engages with the locking bar engagement opening 19 is shown. FIG. 18 also schematically illustrates the particular position that the rotary handle 40 assumes in the unlocked position. This figure clearly shows that in the locked position the rotary handle 40 terminates flush with the top side 2" of the work platform 2. It is also readily seen that when the locking member 11 is unlocked the rotary handle 40 leaves the work platform 2 and projects beyond the top side 2".

The locking member 11 is actuated only by hand, from the top side 2" of the work platform 2.

The locking member 11 is inserted into the opening 10 and is fixed by means of fastening screws 54. The fastening screws 54 project through the boreholes 44 and are screwed into the work platform 2. The opening 10 provides lateral indentations 55 to allow the locking member 11 to be inserted far enough into the work platform 2. The indentations 55 conform to the shape of the fastening flanges 43.

Figure 21:
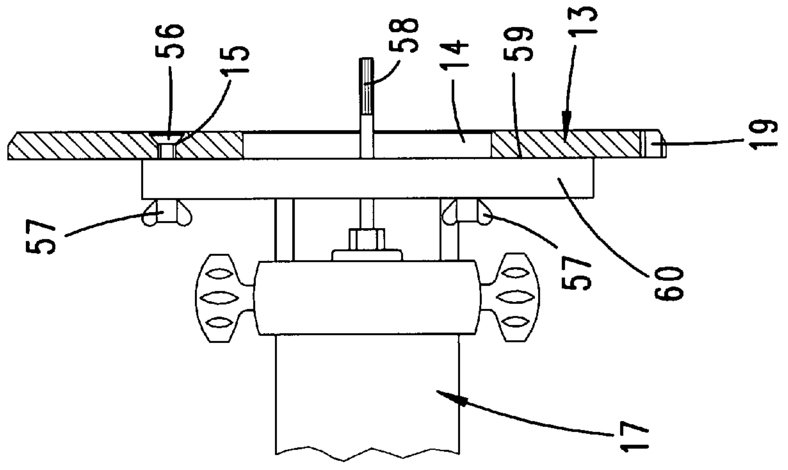
FIG. 21 shows a section according to line XXI-XXI from FIG. 20.
Figure 20:
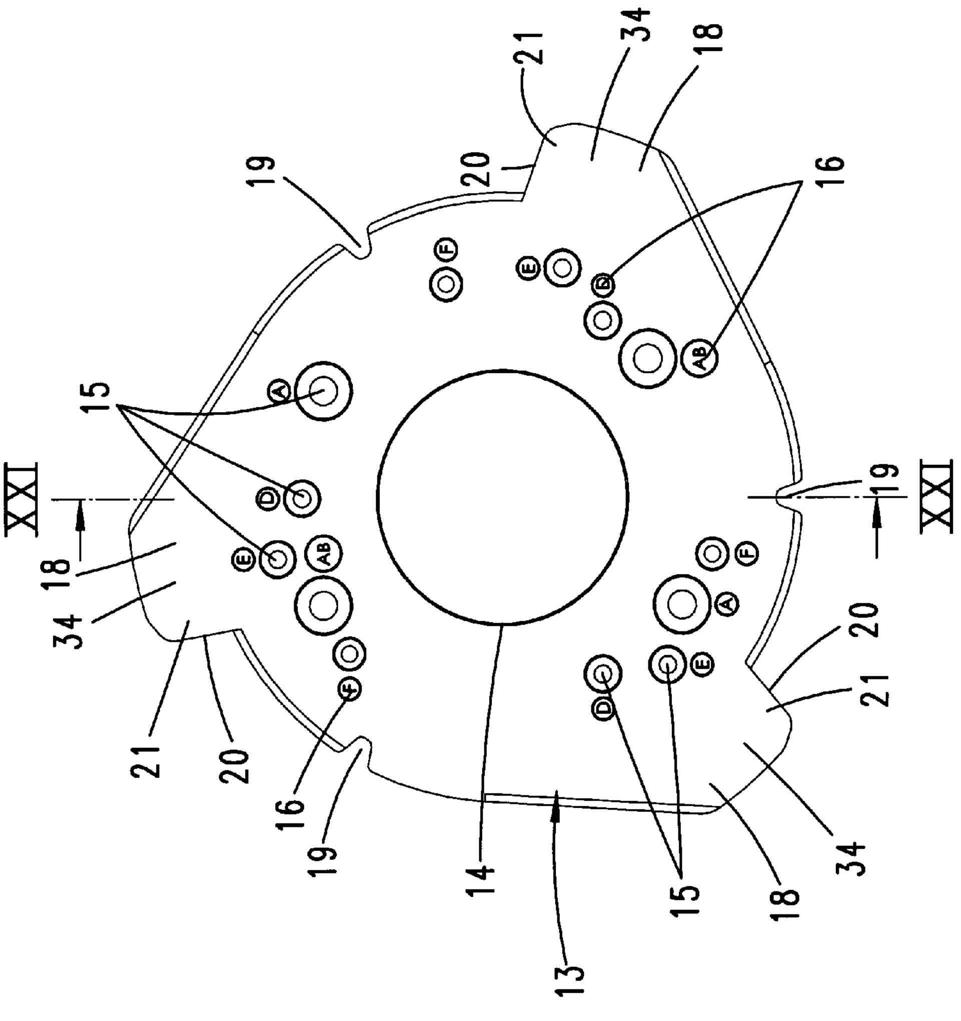
FIG. 20 shows a top view of the fastening ring.
Figure 23:
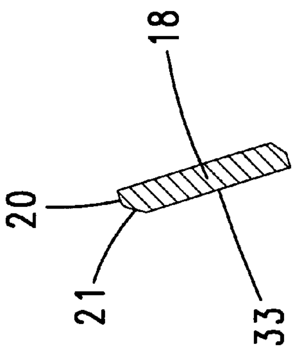
FIG. 23 shows a section according to line XXIII-XXIII from FIG. 22.

FIG. 21 shows the manner in which the hand router 17 together with the base ring 60 is fastened to the fastening ring 13. The hand router 17 is connected to the fastening ring 13 by means of fastening screws 56 and a wing nut 57. The figure also shows the manner in which the cutter 58 projects through the opening 14 in the fastening ring 13.

The method of operation of the first exemplary embodiment is described in greater detail in the following section.

To be able to use the fastening device 61 for a hand router 17, the fastening ring 13 must first be mounted on the bottom 59 of the base ring 60 for the hand router 17. The base ring 60 is attached to the fastening ring 13 in such a way that the holes in the base ring 60 align with the matching boreholes 15 in the fastening ring 13. The fastening ring 13 can then be mounted on the base ring 60 by means of the fastening screws 56 and, for example, a wing nut 57 (see FIG. 21). After the hand router 17 has been mounted on the fastening ring 13, the fastening ring 13 can be inserted into the fastening device 61 for the workbench 1.

The fastening device 61 essentially comprises the depression 7, the locking member 11, and the insert pieces 22. The fastening ring 13 is inserted, together with the fastening projections 18, into the edge recesses 9 in the depression 7 in such a way that the fastening ring 13 is introduced to the work platform 2 from below, and the fastening projections 18 are situated in the free space in the edge recesses 9, in front of the insert pieces 22.

Figure 4:
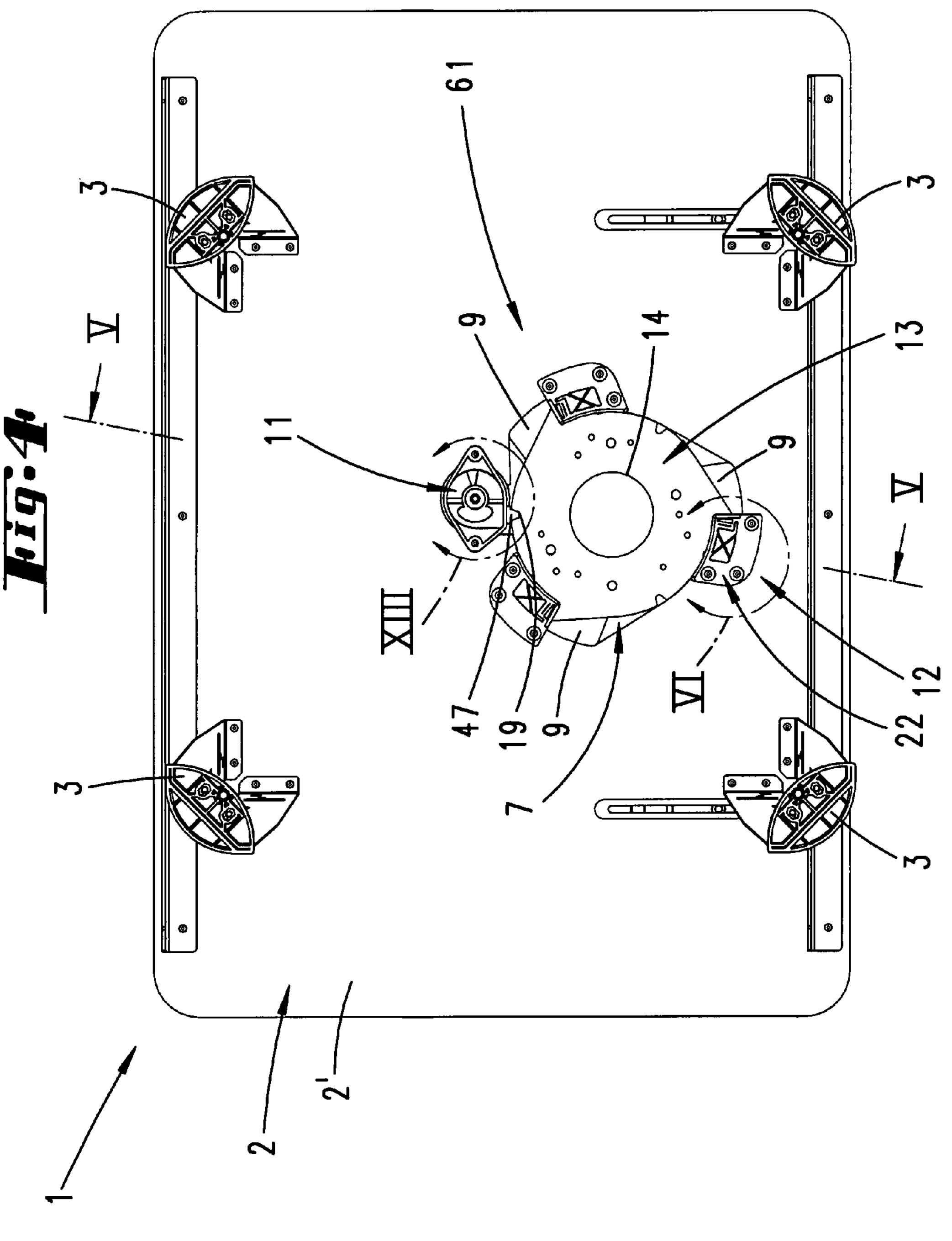
FIG. 4 shows a view from beneath according to line of sight IV from FIG. 1.
Figure 5:
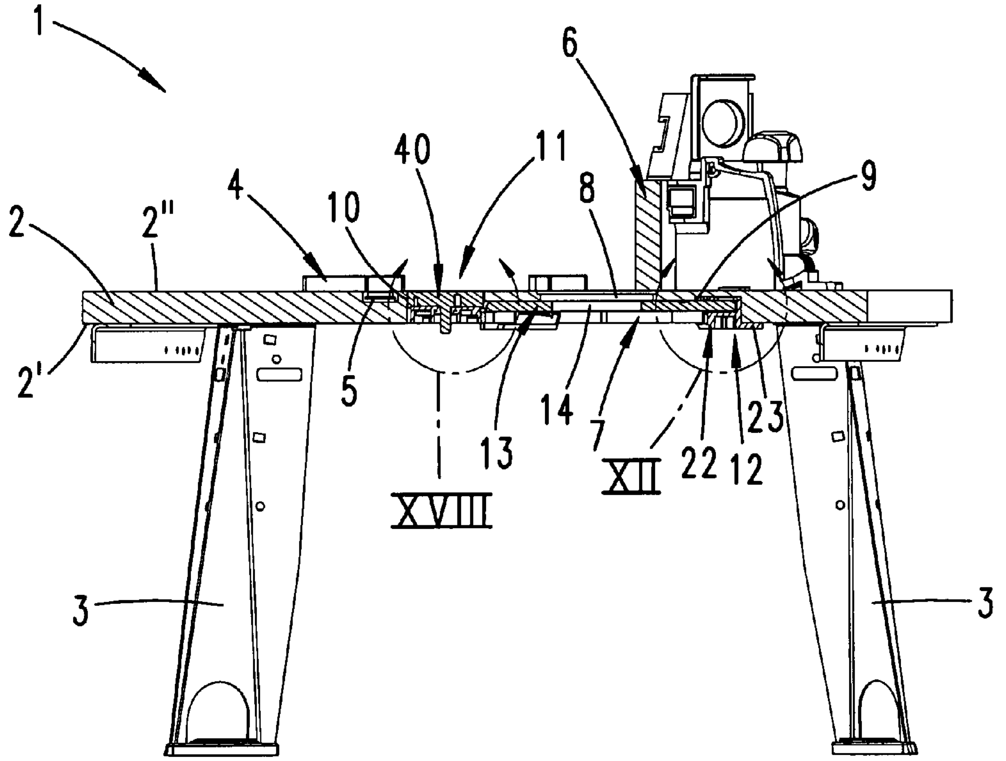
FIG. 5 shows a section according to Line V-V.
Figure 6:
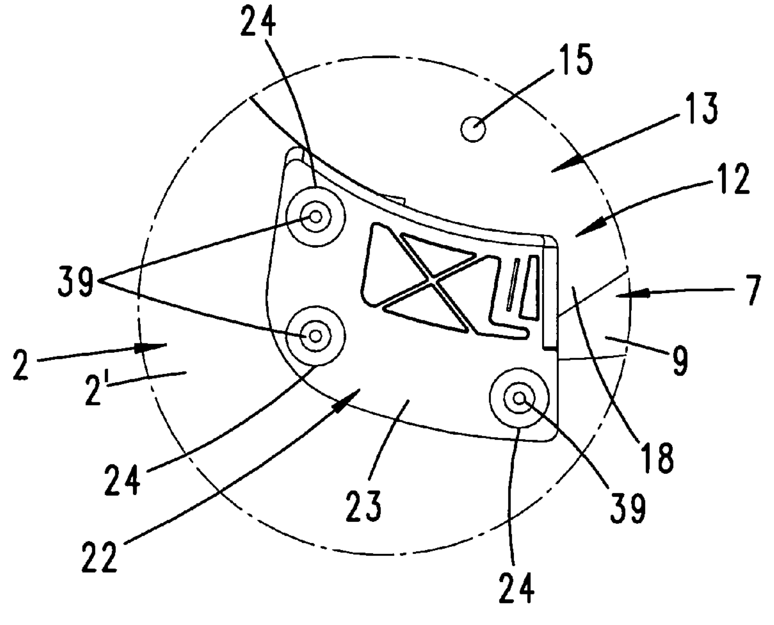
FIG. 6 shows an enlarged cutaway view according to VI from FIG. 4, showing a fastening member in the installed state.
Figure 7:
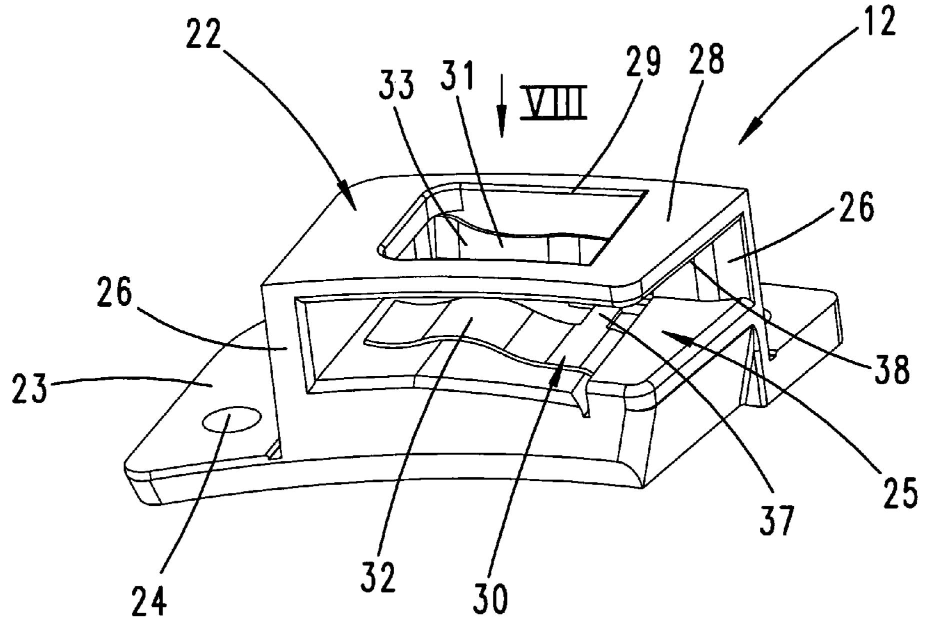
FIG. 7 shows a perspective view of the fastening member.
Figure 13:
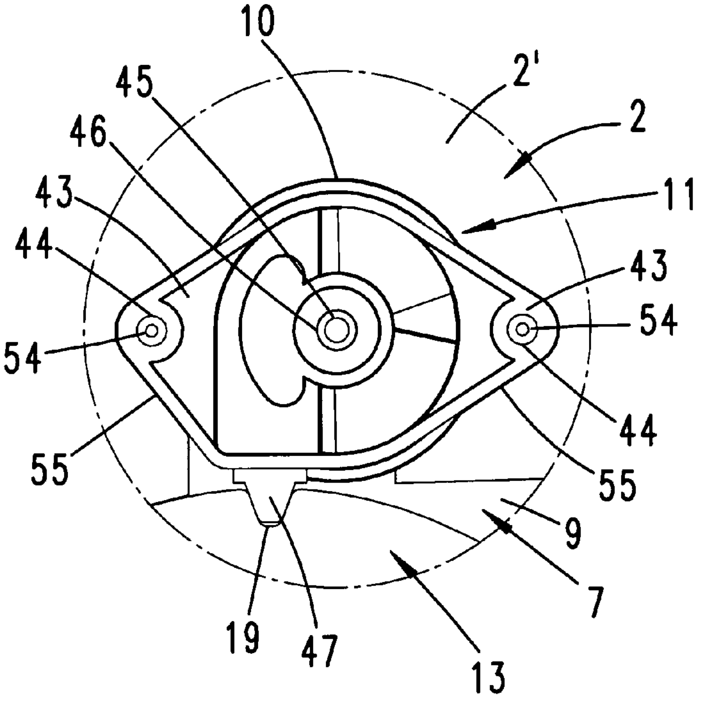
FIG. 13 shows an enlarged cutaway view according to XIII from FIG. 4, in which the locking member is engaged with the fastening ring.

It is readily seen from FIG. 4 that after insertion into the depression 7 the fastening ring 13 must be rotated in the clockwise direction into the fastening pockets 25 in the insert pieces 22. The second spring tongues 32 are traversed more easily as a result of the beveled surfaces 21 of the fastening ring 13. The rotary handle 40 of the locking member 11 can be actuated by hand when the fastening projections 18 are located completely in the fastening pockets 25 for the insert piece 22. The rotary handle 40 can be actuated only from the top side 2" of the work platform 2. FIG. 18 shows that in its starting position the rotary handle 40 projects beyond the topside plane 2" of the work platform 2. After the rotary handle 40 is actuated, its end face 62 terminates flush with the top side 2" of the work platform 2. Actuation of the rotary handle 40 causes the locking bar 47 to be displaced into a locking bar engagement opening 19. As shown in FIG. 13, the tip of the locking bar conforms to the shape of the locking bar engagement opening 19. The locking member 11 prevents the fastening ring 13 from moving out of the fastening pockets 25.

With their leaf spring members 30 the insert pieces 22 impinge on the fastening ring 13 in both the axial and radial directions. The fixing elements 33 formed by the first spring tongues 31 of the leaf spring member 30 impinge on the fastening ring 13 in the radial direction, and center the fastening ring in the depression 7. The second spring tongues 32 tension the fastening ring 13 against the support surface 38 of the cover 28 for the insert pieces 22. FIGS. 3 and 21 show that the cutter 58 projects through the opening 14 in the fastening ring 13 and through the opening 8 in the work platform 2. The cutter 58 protrudes beyond the topside plane 2" of the work platform 2.

This fastening device 61 allows a hand router 17 or the like to be quickly and easily installed. If various work tools, in particular hand routers, are each equipped with a fastening ring 13, the individual tools may be rapidly exchanged with one another despite the fact that these tools are properly and securely joined to the workbench 1 in the same respective position.

Figure 26:
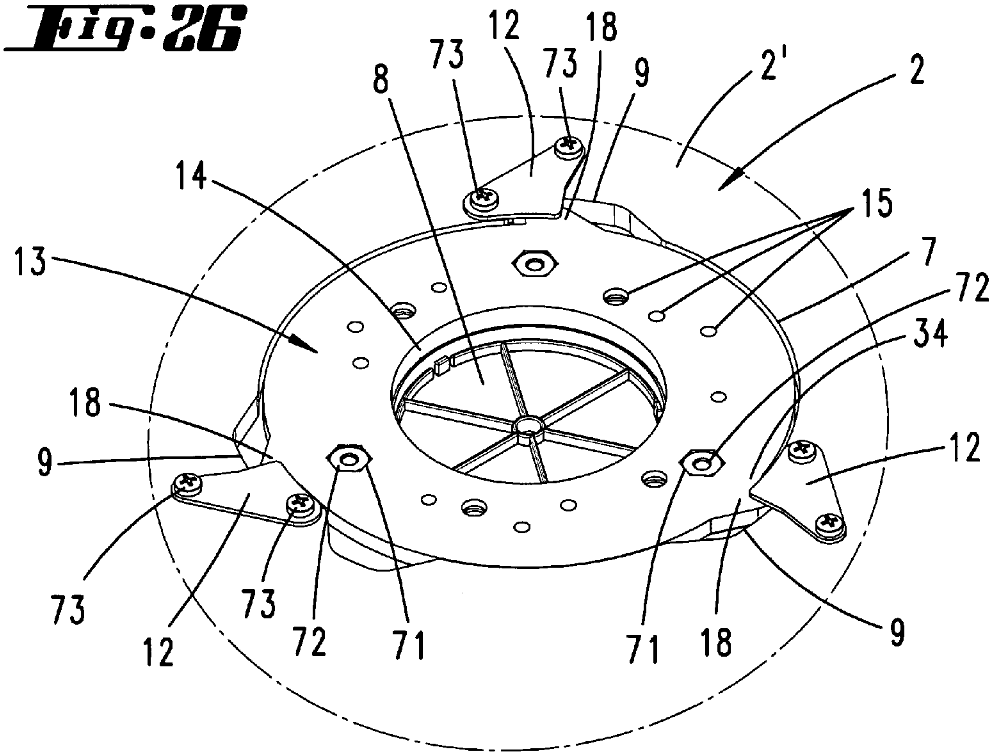
FIG. 26 shows an enlarged cutaway view according to XXVI from FIG. 25, the fastening ring being held for installation of the fastening members.
Figure 27:
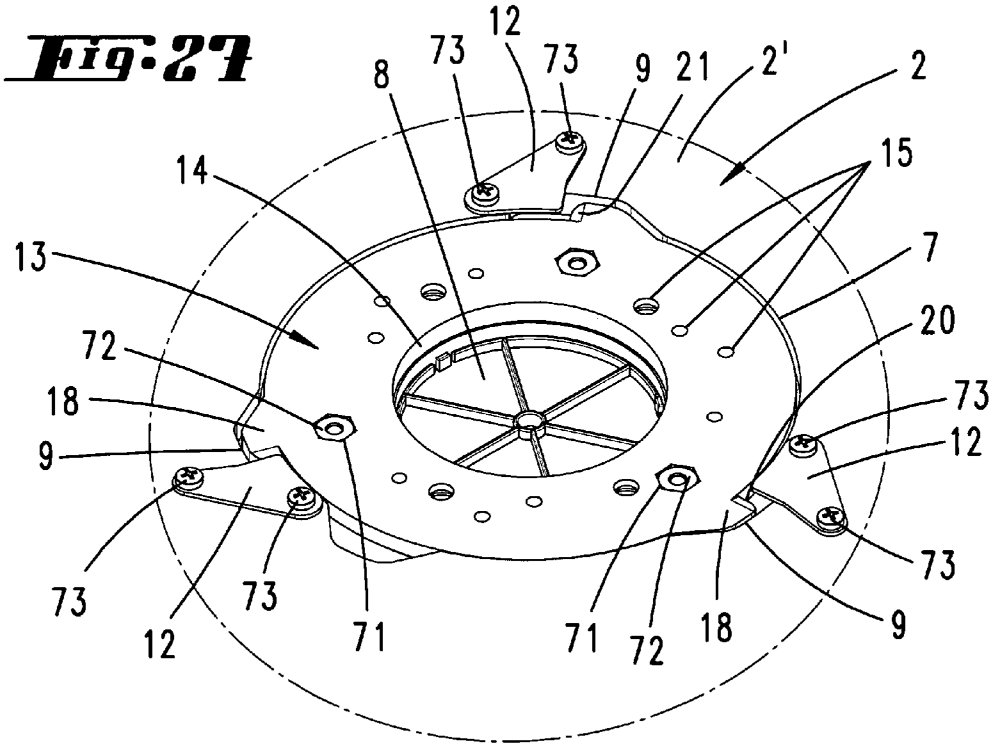
FIG. 27 shows a view according to FIG. 26, except that in this case the fastening ring is not held by the fastening members.
Figure 28:
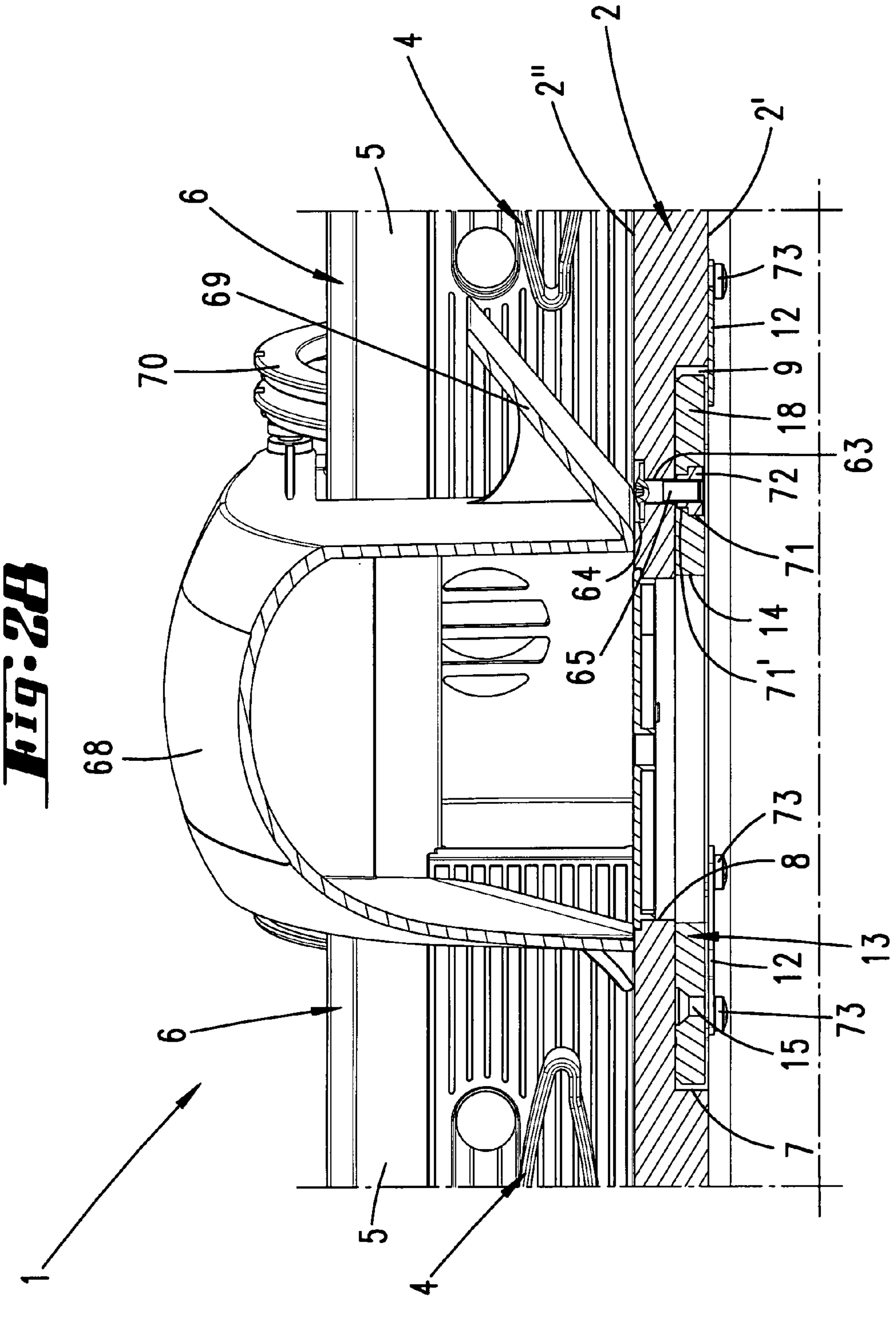
FIG. 28 shows a section according to line XXVIII-XXVIII from FIG. 25.

FIGS. 24 through 28 illustrate a second exemplary embodiment of a workbench 1. This exemplary embodiment differs from the first exemplary embodiment essentially in that the former design has no locking member, and the workbench 1 has height-adjustable support legs 3. The additional necessary functional components are identical to those previously described, and are denoted by the same reference numerals. The work platform 2 is designed essentially as described for the first exemplary embodiment, except that the work platform 2 no longer has an opening for a locking member. Three, for example, through boreholes 63 are provided around the opening 8. The through boreholes 63 are positioned in a hole circle around the midpoint of the opening 8, and define the same angle (120°, for example) with respect to one another. FIG. 28 shows that the through boreholes 63, starting from the top side 2" of the work platform 2, each have a countersunk recess 64. The countersunk recesses 64 and the through boreholes 63 conform to the shape of the screws 65. In each case the countersunk recess 64 is embedded in the work platform 2 to a depth such that the head of the respective screw 65 in the mounted state of the fastening ring 13 is situated beneath the top side 2" of the work platform 2 (see FIG. 28).

A known variable-angle stop 66 is provided in the groove 5 on the top side 2". A hold-down element 4 is also associated with each workpiece guide stop 6. The hold-down elements 4 in each case may be fixed in position in the respective groove 5 by means of a set screw 67. A set screw 67 is likewise provided to fix the stop 66 in place in the groove 5 of the work platform 2 and to set a selected angle. The set screws 67 engage with known slot pins (not illustrated in greater detail) which cooperate with the grooves 5 in a known manner.

Figure 24:
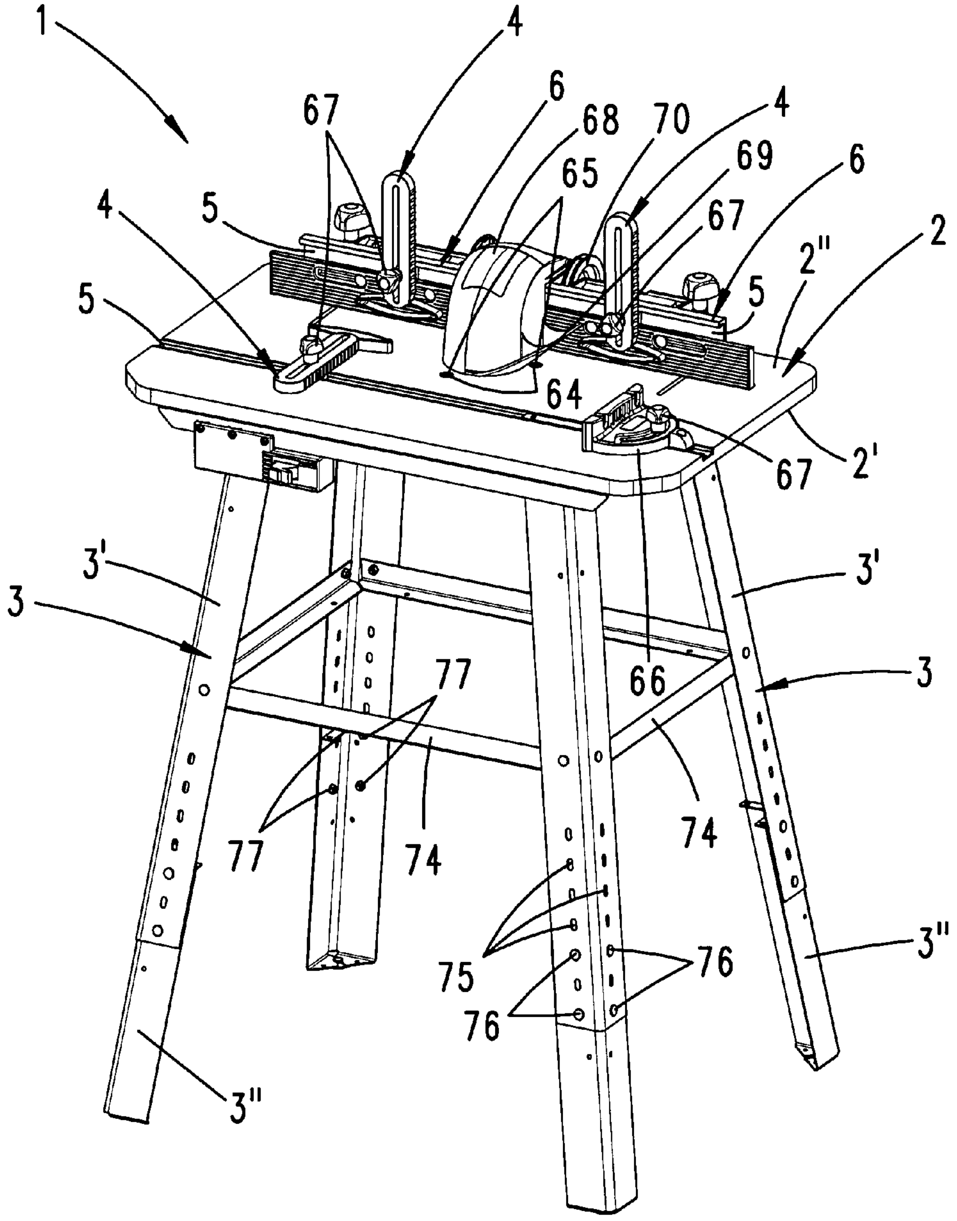
FIG. 24 shows a perspective view of a second exemplary embodiment in the line of sight directed toward the workbench, the milling table also having a support stand which is adjustable in height.
Figure 25:
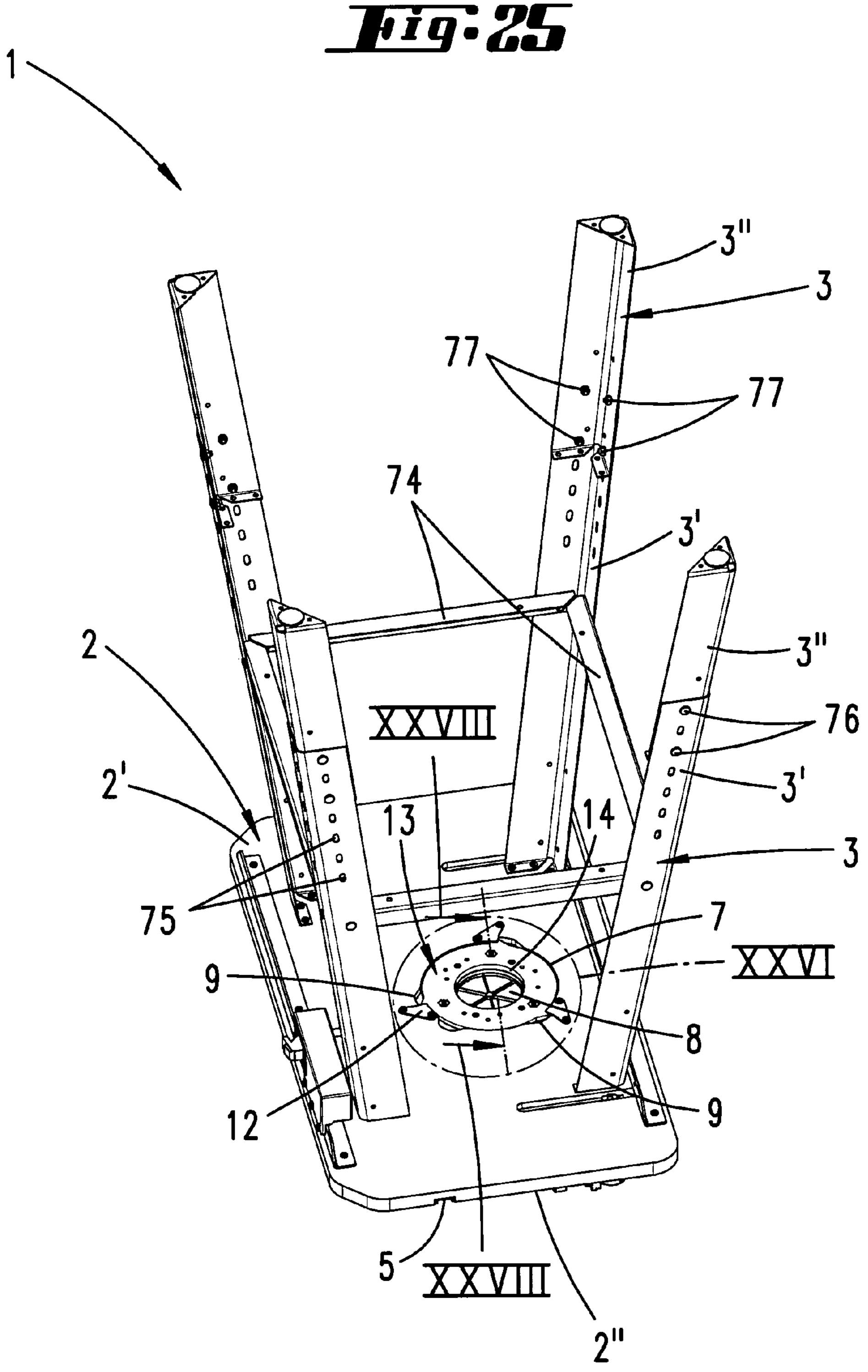
FIG. 25 shows a perspective view in the line of sight below the workbench.

In the exemplary embodiment, the opening 8 is covered by a protective hood 68 which protects the user from any particles emitted during the milling process. A suction device may also be provided on the protective hood 68 which draws off the shavings produced during milling. In FIG. 24, the protective hood 68 forms a control bevel 69 on the right side. As shown in FIG. 28, in the unused state of the workbench 1 the protective hood 68 rests on the top side 2" of the work platform 2 and encloses the opening 8. If a workpiece is then moved against the control bevel 69 from the right side, the protective hood 68 swivels by means of a swivel mechanism 70 until the workpiece can be pushed through between the protective hood 68 and the work platform 2. The swivel mechanism 70 for the protective hood 68 is not further described.

FIGS. 25 through 28 show the manner in which the fastening ring 13 is joined to the work platform 2 in this exemplary embodiment. The fastening ring 13 is essentially designed as previously described. The fastening ring 13 comprises a flat steel plate having a circular central opening 14. The shape of the outer circumference is likewise circular. Extensions project radially outward from the outer circumference in a uniform angular distribution, and form fastening projections 18. The fastening projections each have beveled flanks 20 which lie on a radial line. Also provided in the fastening ring 13 are three hexagonal countersunk recesses 71 which merge into a through borehole 71'. The countersunk recesses 71 are associated with the side of the fastening ring 13. The countersunk recesses 71 are situated on the same hole circle as the through boreholes 63 for the screws 65, and overlap one another. In each countersunk recess 71 a hexagon nut 72 is provided whose thread conforms to the screws 65. In the mounted state of the fastening ring 13 the screws 65 engage with the hexagon nuts 72.

The depression 7 likewise forms edge recesses 9, which are twice as wide as the fastening projections 18 for the fastening ring 13. The depth of the edge recesses 9 in the work platform 2 is the same as that of the depression 7. A portion of each edge recess 9 is covered by a fastening member 12 in the form of a flat element. The fastening members 12 have the approximate shape of a triangle. The covered portion of the edge recess 9 is preferably adapted to the size of the fastening projection 18 for the fastening ring 13. The fastening members 12 are preferably securely connected to the work platform 2 by means of two screws 73.

In the second exemplary embodiment the support legs 3 have a two-part design. One support leg part 3' has a fixed connection to the work platform 2, as in the first exemplary embodiment, and one support leg part 3" has a variable connection to the support leg part 3'. In each case, two support leg parts 3' which are respectively associated with one side of the work platform 2 are securely connected to one another by a brace 64. Multiple oblong holes 75 are provided one above the other in the angled design of the support leg parts 3', below the brace 64 and parallel to the longitudinal extension of the support legs 3. The congruent support leg parts 3" engage with the support leg parts 3', and each may be joined by means of four fastening screws 76. The fastening screws 76 project through the oblong holes 75, then pass through boreholes in the support leg part 3" and are fixed by means of nuts 77. The fastening screws 76 are separated at a distance from one another such that in the installed state of the support legs 3, in each case one oblong hole 75 is situated between the two fastening screws 76. As a result of the superposed oblong holes 75 it is possible to vary the longitudinal extension of the support legs 3, and thus also the height of the work platform 2.

The method of operation of the second exemplary embodiment is explained in greater detail in the following section.

The fastening ring 13 together with the fastening projections 18 is inserted into the edge recesses 9 (FIG. 27), as in the first exemplary embodiment, and then, proceeding from FIG. 27, is twisted in a clockwise direction. This is shown in FIG. 26. In this position of the fastening ring 13 the screws 65 can be screwed in from the top side 2" of the work platform 2, through the through boreholes 63 and into the hexagon nuts 72. The fastening ring 13 is rotationally fixed by the screws 65. The fastening members 12 are used only to hold the fastening ring 13 in the installed position (FIG. 26). Before the fastening ring 13 is rotationally fixed by the screws 65, it is held to the work platform 2 by means of the fastening members 12. When the screws 65 are screwed into the hexagon nuts 72, the fastening ring 13 (together with a mounted hand router, not illustrated here) must by necessity be secured from the underside 2' of the work platform 2.

Figure 29:
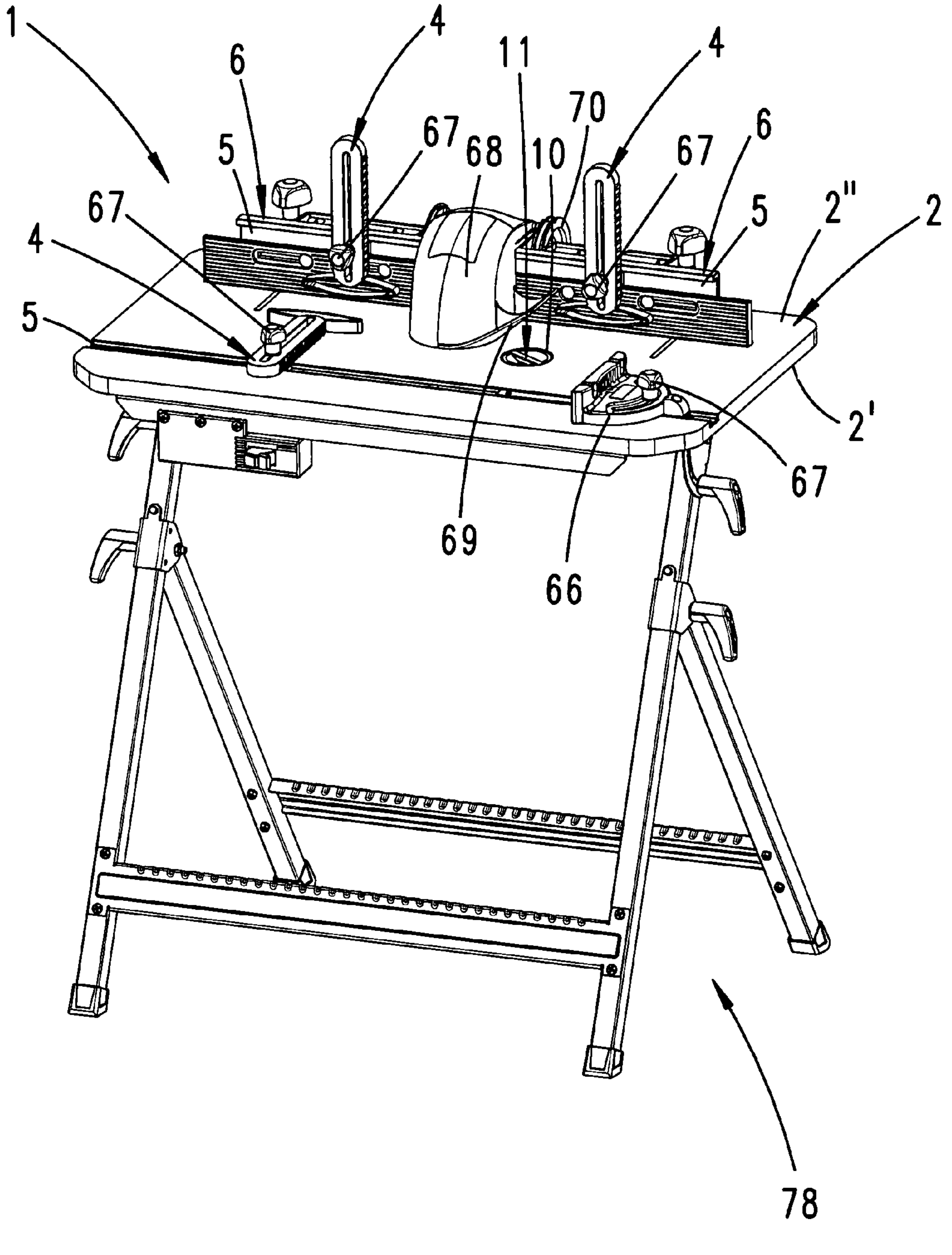
FIG. 29 shows a perspective view of a further exemplary embodiment in the line of sight directed toward the workbench, the milling table having a support stand which is adjustable in height.

FIG. 29 illustrates a third exemplary embodiment in which the workbench 1 is essentially designed as previously described for the second exemplary embodiment. However, in the present case the fastening ring 13, as in the first exemplary embodiment, is fixed to the work platform 2 by means of a locking member 11. In this instance the workbench 1 has a support stand 78 which is known from German Unexamined Patent Application DE 100 41 956 A1. This support stand 78 has a height-adjustable design and can be folded up for storage of the workbench 1. Thus, the workbench 1 may be compactly stored. As a result of the variable height adjustment of the support stand 78, the height of the work platform 2 can be optimally adjusted to the particular user of the workbench 1.

All disclosed features are (individually) essential to the invention. The disclosed content of the associated/accompanying priority documents (copy of the prior application) is hereby incorporated in full into the disclosure of the present patent application, also for the purpose of including features from these documents in claims for the present patent application.

It should be understood that various changes and modifications to the presently preferred embodiments described herein will be apparent to those skilled in the art. Such changes and modifications can be made without departing from the spirit and scope of the present invention. It is therefore intended that such changes and modifications be covered by the appended claims

The invention claimed is:

1. A fastening device for fastening a hand router having a tool axis of rotation to an underside of a work platform of a workbench, having radially outwardly extending projections which are associated with a base ring for the hand router and which may be introduced into associated fastening pockets by rotating the base ring in a depression in a lowermost surface of the underside of the work platform, wherein the fastening pockets are formed by fastening members associated with an edge of the depression at the underside of the work platform.

2. The fastening device according to claim 1, wherein the fastening projections are associated with a fastening ring which may be connected to a bottom of the base ring.

3. The fastening device according to claim 2, wherein at least three of the fastening projections project from the fastening ring in a uniform distribution around a circumference of the fastening ring.

4. The fastening device according to claim 3, wherein the fastening projections are integral with the fastening ring.

5. The fastening device according to claim 2, wherein the fastening ring is fixed in a radial direction by means of fixing elements of the fastening members which act in the radial direction and which are activated when the fastening ring is rotated.

6. The fastening device according to claim 5, wherein the fixing elements have springs.

7. The fastening device according to claim 5, wherein each of the fixing element is a spring tongue of a leaf spring member, which each spring tongue with a respective second spring tongue impinges on a side of the respective fastening projection.

8. The fastening device according to claim 2, wherein a hand-actuated locking member having a locking bar is provided, which locking bar may be displaced for rotationally fixing the fastening ring via engagement of the locking bar in a locking bar engagement opening associated with the fastening ring.

9. The fastening device according to claim 8, wherein the locking member may be actuated from a top side of the work platform.

10. The fastening device according to claim 8, wherein the locking member has a rotary handle, an end face of which in a locked position is situated flush with the top side of the work platform, and in an unlocked position projects beyond the top side of the work platform.

11. The fastening device according to claim 10, wherein the rotary handle rests on a bearing surface which resembles a screw thread.

12. The fastening device according to claim 8, wherein the locking bar is a sliding bolt, controlled in a mortise-tenon fashion by the rotary handle, which sliding bolt enters the locking bar engagement opening in the fastening ring.

13. The fastening device according to claim 2, wherein the fastening projections have flanks which have beveled surfaces that point in a direction of rotation of the fastening ring.

14. The fastening device according to claim 2, wherein the fastening ring is rotationally fixed and joined to the work platform by of screws.

15. The fastening device according to claim 1, wherein said depression has an opening for the passage of a rotary drive-operable cutter for the hand router.

16. The fastening device according to claim 1, wherein the fastening members are associated with edge recesses in the depression whose widths in a circumferential direction of the depression are each more than twice a width of the associated fastening projection.

17. The fastening device according to claim 1, wherein the fastening members cover the edge of the depression, and are fixed to the work platform by means of fastening screws that are screwed through fastening openings.

18. The fastening device according to claim 1, wherein the fastening members form insert pieces.

19. The fastening device according to claim 18, wherein the insert pieces are made of plastic.

20. The fastening device according to claim 18, wherein each of the insert pieces has a cover which forms a side wall.

21. The fastening device according to claim 1, wherein a side wall of each of the fastening pockets is formed by a ridge which is L-shaped in a horizontal projection and which contacts a border of an edge recess of the depression.

22. The fastening device according to claim 1, each fastening pocket further comprising at least one leaf spring which extends into the respective fastening pocket for impingement on a respective fastening projection which is inserted into the respective fastening pocket.

23. The fastening device according to claim 1, wherein the depression is deeper than a thickness of a fastening ring, and has a circumferential contour which centrally accommodates the fastening ring.

24. The fastening device according to claim 1, wherein the fastening members are flat elements which at one section each cover a portion of an edge recess in the depression.

25. The fastening device according to claim 1, further comprising a support stand which bears the work platform and which is adjustable in height.

26. A milling table having a work platform and a fastening device according to claim 1 for fastening a hand router to the underside of the work platform.

* * * * *